(12) United States Patent
Jansen et al.

(10) Patent No.: US 11,219,943 B2
(45) Date of Patent: Jan. 11, 2022

(54) PLATE, IN PARTICULAR COVERING PLATE FOR MOLTEN METAL, AND METHOD FOR PRODUCING THE PLATE AND USE THEREOF

(71) Applicant: Refratechnik Holding GmbH, Ismaning (DE)

(72) Inventors: Helge Jansen, Düsseldorf (DE); Thomas Schemmel, Meerbusch (DE); Petra Stein, Göttingen (DE); Michael Schölwer, Velbert (DE)

(73) Assignee: Refratechnik Holding GmbH, Ismaning (DE)

( * ) Notice: Subject to any disclaimer, the term of this patent is extended or adjusted under 35 U.S.C. 154(b) by 164 days.

(21) Appl. No.: 16/313,505

(22) PCT Filed: Jun. 27, 2017

(86) PCT No.: PCT/EP2017/065919
§ 371 (c)(1),
(2) Date: Dec. 27, 2018

(87) PCT Pub. No.: WO2018/002094
PCT Pub. Date: Jan. 4, 2018

(65) Prior Publication Data
US 2019/0314889 A1 Oct. 17, 2019

(30) Foreign Application Priority Data
Jun. 30, 2016 (DE) ..................... 10 2016 112 039.1

(51) Int. Cl.
*C04B 14/02* (2006.01)
*C04B 26/28* (2006.01)
(Continued)

(52) U.S. Cl.
CPC .............. *B22D 7/10* (2013.01); *B22D 11/106* (2013.01); *C04B 14/024* (2013.01);
(Continued)

(58) Field of Classification Search
CPC ..... C04B 14/024; C04B 18/101; C04B 26/28; C04B 40/0092; C04B 2111/0087;
(Continued)

(56) References Cited

U.S. PATENT DOCUMENTS

| 4,339,115 A | * | 7/1982 | Daussan | ................ | B22D 41/02 |
| | | | | | 266/280 |
| 4,440,575 A | * | 4/1984 | Daussan | ................ | C04B 26/285 |
| | | | | | 75/313 |

(Continued)

FOREIGN PATENT DOCUMENTS

| CN | 1594197 A | 3/2005 |
| DE | 2847807 A1 | 5/1979 |

(Continued)

OTHER PUBLICATIONS

European Patent Office, Rijswijk, Netherlands, International Search Report of International Application No. PCT/EP2017/065919, dated Aug. 30, 2017, 2 pages.

*Primary Examiner* — Scott R Kastler
*Assistant Examiner* — Michael Aboagye
(74) *Attorney, Agent, or Firm* — Dickinson Wright PLLC

(57) ABSTRACT

A heat insulating plate (1), preferably a covering plate (5*a;b*), especially for thermal isolation of molten metal, especially of molten steel, in a metallurgical vessel (6), wherein the plate (3) includes a binding agent matrix (2) of at least one, set, temporary, organic binding material and aggregate grains (3) with and/or of biogenic silicic acid, preferably with and/or of rice husk ash, which grains (3) are incorporated into the binding agent matrix (2), and to a method for production of the plate (1) and its use.

40 Claims, 6 Drawing Sheets

(51) Int. Cl.
    *B22D 7/10*     (2006.01)
    *B22D 11/106*     (2006.01)
    *C04B 18/10*     (2006.01)
    *C04B 111/00*     (2006.01)

(52) U.S. Cl.
    CPC ............ *C04B 18/101* (2013.01); *C04B 26/28* (2013.01); *C04B 2111/00887* (2013.01); *C04B 2201/30* (2013.01)

(58) Field of Classification Search
    CPC .......... C04B 2111/285; C04B 2201/30; C04B 28/24; C04B 14/062; C04B 2111/00431; C04B 2111/763; C04B 2201/50; B22D 11/106; B22D 7/10; B22D 11/10; B22D 41/00; B22D 41/02; B22D 7/102
    USPC .......... 266/280, 271, 283, 286; 75/709, 751, 75/764, 773, 301
    See application file for complete search history.

(56) References Cited

U.S. PATENT DOCUMENTS

| | | | | |
|---|---|---|---|---|
| 4,555,448 A | * | 11/1985 | Durham | C08K 3/36 428/402 |
| 4,750,717 A | * | 6/1988 | Pheasant | B22D 41/02 266/275 |
| 5,164,003 A | * | 11/1992 | Bosco | C04B 12/04 106/287.1 |
| 5,204,298 A | * | 4/1993 | Yaoi | B22D 41/02 501/108 |
| 5,240,492 A | * | 8/1993 | Phillips | B22D 11/111 75/305 |
| 5,422,323 A | * | 6/1995 | Banerjee | C04B 35/18 266/280 |
| 7,594,948 B2 | * | 9/2009 | Ackermann | B22D 11/111 75/305 |
| 9,868,149 B2 | * | 1/2018 | Recknagel | B22C 1/08 |
| 9,914,665 B2 | * | 3/2018 | Ruckert | C04B 35/62695 |
| 10,138,421 B2 | * | 11/2018 | Tong | C09K 21/04 |
| 2007/0082190 A1 | * | 4/2007 | Endres | C04B 20/1051 428/312.2 |
| 2011/0192324 A1 | | 8/2011 | Knevels | |

FOREIGN PATENT DOCUMENTS

| | | | | |
|---|---|---|---|---|
| DE | 3020681 A1 | | 3/1981 | |
| DE | 19731653 A1 | | 1/1999 | |
| DE | 19728368 C1 | | 3/1999 | |
| DE | 10105620 A1 | | 9/2002 | |
| DE | 102012219236 A1 | | 4/2014 | |
| DE | 102013000527 A1 | | 7/2014 | |
| GB | 2347143 | * | 8/2000 | ........... C04B 18/101 |
| GB | 2347143 A | | 8/2000 | |
| JP | S57202950 A | | 12/1982 | |

* cited by examiner

PLATE, IN PARTICULAR COVERING PLATE FOR MOLTEN METAL, AND METHOD FOR PRODUCING THE PLATE AND USE THEREOF

CROSS-REFERENCE TO RELATED APPLICATIONS

This application is a 35 U.S.C. § 371 national phase application of International Application No.: PCT/EP2017/065919, filed Jun. 27, 2017, which claims the benefit of priority under 35 U.S.C. § 119 to German Patent Application No. 10 2016 112 039.1, filed Jun. 30, 2016, the contents of which are incorporated herein by reference in their entirety.

FIELD

The present invention relates to a heat insulating plate on the basis of biogenic silicic acid, preferably rice husk ash, set with a binding material and to a method for its production and use. The present disclosure relates in particular to a covering plate for molten metal, in particular for molten steel, and to a method for its production and use.

BACKGROUND

The statements in this section merely provide background information related to the present disclosure and several definitions for terms used in the present disclosure and may not constitute prior art.

In metallurgy it is common to cover the free surface of the molten metal, in particular the molten steel, located in an open metallurgical vessel, with a covering material. The covering material forms a protective and heat insulating layer. Firstly, it shields the molten metal bath from atmospheric gases in order to prevent undesirable chemical reactions of the molten metal. Secondly, it is used for isolation or for thermal insulation, respectively. Thus the covering material ensures a good surface quality.

As covering material, usually loose bulk material made of refractory materials is used, in particular materials made from rice husk ash. Rice husk ash is produced in large quantities in many rice-producing countries. It is produced as a byproduct of the combustion of rice husk (spelt). When this material is burned, rice husk ash is produced which is chemically very pure and is composed 94-96% of amorphous $SiO_2$. Rice husk ash is thus also called biogenic silicic acid. It has a very high melting point of about 1,650° C. In its production, the volatile constituents burn off, but a unique, microporous structure of the $SiO_2$ is retained. From this structure there results both an extremely low thermal conductivity and also a low bulk weight of the rice husk ash. Consequently, rice husk ash does indeed have an outstanding thermal insulation, however, due to its great fineness, in particular when applied onto the surface of the molten metal, it causes a significant generation of dust which can be hazardous to health. This is because the minute dust particles can move into the human body and can cause, for example, eye injury. Therefore, ventilation equipment, for example, has to be installed, which in turn, owing to the suctioning of the rice husk ash, can result in loss of material.

For this reason, it is also known in the prior art, to use granulates as covering material, instead of the pure rice husk ash. These granulates consist of granulated refractory materials which are solidified by means of a binding material. Granulates of this kind are known, for example, from DE 10 2013 000 527 A1, DE 197 28 368 C1 and DE 197 31 653 C2.

The granulates in DE 10 2013 000 527 A1 contain primarily and preferably up to 90 wt % of kieselguhr. As binding material, for example, bentonite, water-glass or cellulose is used. Also, the granules can contain polyvinyl polypyrrolidone as binding material. The granulate itself melts after a certain amount of time.

The granulate known from DE 197 28 368 C1 comprises granules which are produced from rice husk ash, an organic, gel-forming binding material in quantities from 1 to 10 wt %, and water in quantities from 20 to 100 wt %.

The beads/pellets of the granulate known from DE 197 31 653 C2 consist of rice husk ash which is mixed with a surface-active substance and a binding material. The surface-active substance can be sodium alginate, a sodium salt of carboxymethyl cellulose, sodium hexametaphosphate or mixtures thereof. With regard to the binding material, it can be polyvinyl alcohol, molasses, sodium hexametaphosphate, Portland cement, sodium silicate and precipitated calcium carbonate and mixtures thereof. The beads/pellets after mixing and compaction, are dried and then fired at a temperature of 800-1400° C.

The granulates do indeed result in a significantly reduced dust pollution in comparison to pure rice husk ash. But they also comprise a greater bulk weight and thus provide a poorer insulation. In addition, due to their manufacture they are also considerably more expensive than bulk material made of pure rice husk ash.

The metallurgical vessels to be covered pertain in particular to casting distributors, preferably to a continuous casting distributor (tundish), a steel ladle or to an ingot mold for rising ingot casting. In ingot casting, the liquid metal is filled into a standing mold (ingot mold) and solidifies therein. The mold can be filled either from above, or also from below (rising) through a feeding system. After solidifying, the ingot mold is stripped off, that is, it is removed from the solidified metal and the ingot is further processed.

In the case of the rising ingot casting in the production of steel, usually first a retaining plate or metal rod is set onto the ingot mold. The retaining plate usually consists of heat-supplying materials (called "exothermal plate") of mixtures of various, refractory oxides with metal powder, and frequently fluoride-containing components. A bag of casting powder is attached to the retaining plate or the metal rod, by means of a cord. After a short time, the bag burns up due to the high heat of the molten steel, so that the casting powder is distributed onto the molten steel and acts as a separating agent between the ingot mold and the steel bath. Next, the retaining plate or the metal rod is removed and the particular bulk material is manually poured as covering material onto the surface of the molten metal. This method is very cumbersome and due to the immediate proximity to the hot ingot mold, it is dangerous to the performing personnel.

SUMMARY

The object of the present disclosure is to provide a plate based on rice husk ash, which ensures a good heat insulation both at low and also at high temperatures.

The object of the present disclosure is in particular to provide a covering plate for covering of the exposed surface of a metal bath, in particular of a steel bath, in an open-top metallurgical vessel which ensures a good heat insulation and the smallest possible dust generation and which is easy to apply.

An additional object is to provide a simple and low-cost method for production of such a plate.

These objects are achieved by a plate for thermal isolation of molten metal in a metallurgical vessel, wherein the plate comprises a binding agent matrix of at least one set binding material and aggregate grains with and/or of biogenic silicic acid, which grains are incorporated into the binding agent matrix, characterized in that as additional aggregate material, the plate comprises at least one expanding agent which expands under temperature load, such that the plate disintegrates into a loose, free-flowing bulk material.

These objects are further achieved by a method for producing a heat insulating plate, characterized by the following method steps:

a) Preparation of a mixture comprising the aggregate grains with and/or of the biogenic silicic acid, at least one binding material, the at least one expanding agent, and potentially a solvent for the binding material(s), b) Filling the mixture into a mold, c) Compacting the mixture, d) Removal of the green plate from the mold, and e) Letting the plate set.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will be explained in greater detail below, based on the figures. The figures show.

Figure 1:
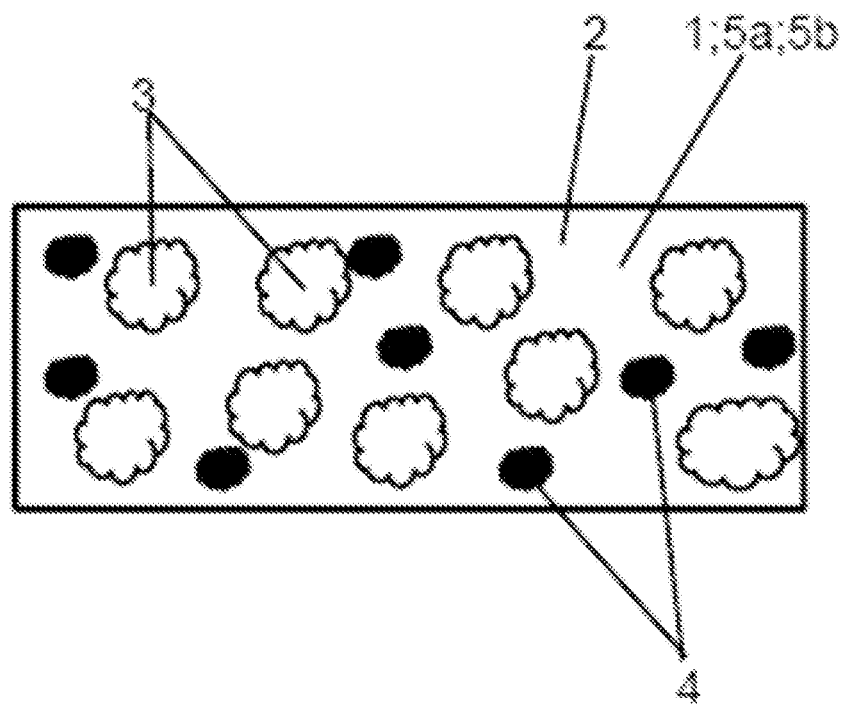
FIG. 1—A schematic cross section through the inventive plate.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

The plate 1 according to the present disclosure (FIGS. 1-6) comprises a binding agent matrix 2 made of a set binding material in which aggregate grains 3 of biogenic silicic acid, preferably of rice husk ash, are embedded or incorporated. The aggregate grains 3 are distributed in the binding agent matrix 2. According to the present disclosure, the binding material is an organic, temporary binding material. Or rather, according to the present disclosure, the binding agent matrix 2 consists exclusively of one or a plurality of temporary binding materials. Within the scope of the present disclosure, surprisingly it was found that due to the organic, temporary binding material it is possible to configure the plate in such a manner that after reaching a particular boundary temperature, the binding material burns off so that the plate 1 disintegrates and a loose, bulk pile or a bulk material is produced. Bulk material and/or bulk pile refers to a granular, or to a lumpy mix which is present in a pourable and/or free flowing form. That means that a free flowing material is obtained from the plate 1 due to burn off of the binding material.

Preferably the binding material burns off completely and with no residue, so that after the burn-off, a loose, free flowing bulk material made of pure rice husk ash is obtained.

The temporary, organic binding material pertains preferably to a polymer, preferably a polysaccharide which sets due to polycondensation and burns up completely, that is, without any residue, in the particular atmosphere, especially in an oxygen atmosphere. Thus it pertains to a completely out-burnable binding material. Of course, the matrix of binding material can also consist of several temporary, organic binding materials. Thus in an especially favorable manner, both the temperature range and also the time at which the plate 1 disintegrates can be variably adjusted.

Preferably the temporary binding material pertains to cellulose, preferably methyl cellulose, and/or to polyvinyl alcohol, preferably polyvinyl acetate and/or to polyvinyl pyrrolidone, and/or to lignin sulfonate. But it can also pertain to a synthetic resin which burns out entirely in an oxygen atmosphere.

The temperature at which the plate 1 begins to disintegrate, and the period of time until the plate 1 has fully disintegrated, depend herein on different factors and not only on the type, especially its ignition temperature, and the amount of the temporary binding material. In addition, the temperature and the period of time also depend on the plate thickness and its porosity, among other factors. In addition, the type of temperature stress (e.g. on one side or on all sides) has an influence.

The temperature can variably be adjusted by means of different factors. Preferably the plate 1 according to the present disclosure disintegrates starting at a temperature of $\geq 1500°$ C. and $\leq 800°$ C., preferably $\geq 200°$ C. and $\leq 400°$ C.

Within the scope of the present disclosure, the disintegration temperature is defined as that temperature at which the plate fully disintegrates into a loose pile within a time of 30 minutes.

The disintegration of the plates 1 is tested in this case in a laboratory furnace under an oxygen atmosphere. The furnace is heated to a starting temperature, that is, to 150° C. or 200° C., in particular. A plate sample measuring $50 \times 50 \times 50$ mm$^3$ is placed into the furnace and the temperature is maintained for 30 minutes.

If a complete disintegration occurs within the 30 minutes, then the sample is removed and the furnace is cooled specifically by 50° C. and held for another 30 minutes.

If a complete disintegration does not occur within the 30 minutes, then the sample is removed and the furnace is heated up again, specifically in 50° C. increments and respectively held for 30 minutes.

A new sample is employed at each holding time and the disintegration behavior is observed.

The biogenic silicic acid pertains preferably exclusively to rice husk ash. But also diatomaceous earth (kieselguhr) and/or siliceous rock and/or diagenetic radiolarian taxa solidified into stone and/or sponges made of opal can be used. Also, mixtures of different biogenic silicic acids can also be present as aggregate material.

According to one independently inventive aspect, the plate 1 according to the present disclosure additionally comprise at least one blowing agent and/or propellant and/or disintegration agent and/or expanding agent as aggregate material, which expands under temperature load to a multiple of its original volume. The expanding agent and/or its aggregate grains 4 are likewise distributed in the binding agent matrix 2 and are incorporated or embedded therein. The expanding agent promotes the disintegration of the plate 1 in that when a certain temperature >150° C. is reached, it expands and thus destroys the binding agent matrix. The expanding agent herein is selected in particular such that the expansion temperature is in the range of the ignition temperature of the binding material. The ignition temperature is that particular temperature to which a material or a contact surface has to be heated in order that a combustible substance will self-ignite in the presence of air, exclusively due to its temperature, that is, without any ignition source such as an ignition spark.

If the plate 1 contains at least one expanding agent, then the binding agent matrix 2 need not consist exclusively of one or a plurality of temporary binding materials in order to ensure the disintegration of the plate, even though this is preferred. It can also contain at least one, permanent, set binding material, or consist of permanent, set binding material(s).

Preferably the expanding agent pertains to expandable graphite. The advantage of expandable graphite is that it burns up without residue in oxygen at high temperatures to form carbon dioxide, which evaporates. In this case, after the combustion of the binding material and of the expanding agent, exclusively the biogenic silicic acid, in particular the rice husk ash, remains as a loose or free-flowing, bulk material.

But the expanding agent can also pertain to crude pearlite (non-expanded pearlite) or non-expanded vermiculite or unexpanded clay or synthetic resins, preferably urea formaldehyde and/or melamine formaldehyde resins and/or melamine-phosphoric acid compounds, for example, mono-melamine phosphate, or agents made of other intumescent materials.

In case the plate 1 does not contain any expanding agent, then the refractoriness-under-load test method can be used, with reference to DIN EN 993-8 (February 2007). The plate 1 according to the present disclosure and without expanding material comprises advantageously a $T_5$-temperature of ≥150° C. to ≤800° C., preferably ≥200° C. to ≤400° C.

Furthermore, the plate 1 can also comprise other aggregate materials made of refractory material. Aggregate materials within the meaning of the present disclosure are generally materials that and/or whose grains are distributed in the binding agent matrix and are bonded or embedded in it. During the setting process the aggregate materials do not react, or react only superficially with the binding material. They are incorporated essentially mechanically into the binding agent matrix 2.

In particular, the plate 1 comprises microsilica, preferably pyrogenic and/or precipitated silicic acid. The plate 1 can also comprise expanded perlite and/or expanded vermiculite and/or expanded clay and/or inorganic fibers, preferably mineral and/or slag and/or glass and/or ceramic fibers, and/or fly ashes and/or (power plant) filter dusts as aggregate material.

Preferably aggregate of the plate 1 according to the present disclosure consists at least 50 wt-%, preferably at least 80 wt %, particularly preferably at least 90 wt % of biogenic silicic acid, preferably of rice husk ash, respectively relative to the total content (dry mass) of aggregate materials. However, advantageously the plate 1 according to the present disclosure apart from the expanding agent exclusively comprises biogenic silicic acid, preferably exclusively rice husk ash, as aggregate material. The aggregate of the plate 1 according to the present disclosure thus consists advantageously 100 wt % of biogenic silicic acid, and if present, expanding agent, preferably 100 wt % of rice husk ash and, if present, expanding agent.

The amount of expanding agent relative to the total content (dry mass) of aggregate materials preferably amounts to 0.5 to 10.0 wt %, more preferably 1.0 to 5.0 wt %.

The production of the plate 1 according to the present disclosure proceeds as follows. First, the dry constituents are mixed together. The dry constituents pertain to the biogenic silicic acid and the other aggregate materials, if any, in particular at least one expanding agent, and also if used, at least one, preferably temporary, binding material if it is present in dry form. Next, water or another liquid solvent is added to the dry mixture to dissolve the binding agent. At least one binding agent can also be provided in already dissolved form, and can be added in liquid form to the dry mixture of the other dry ingredients. The single components generally can be mixed in any order.

The composition of the finished mixture is then adjusted advantageously such that the mixture after 30 s under vibration exhibits a slump, determined with reference to DIN EN ISO 1927-4 (March 2013), of 200 to 500 mm, preferably 250 to 350 mm, without any separation occurring between coarse and fine grain fractions, as is the case for pure rice husk ash.

Advantageously the finished mixture, or the batch used to produce the plate 1 has the following composition with regard to the dry constituents relative to the total dry mass, wherein the individual constituents add up to 100 wt-%:

| | Amount [wt %] | |
| --- | --- | --- |
| | | preferably |
| Temporary binding material | 5.0 to 30.0 | 10.0 to 20.0 |
| Biogenic silicic acid, preferably rice husk ash | 35.0 to 94.5 | 57.0 to 89.0 |
| Expanding agent, preferably expanded graphite | 0.5 to 5.0 | 1.0 to 3.0 |
| Other aggregate materials | 0 to 20.0 | 0 to 10.0 |
| Other constituents | 0 to 10.0 | 0 to 10.0 |

Furthermore, the weight ratio of the liquid solvent, preferably of the water, to the dry constituents amounts to preferably 2:1 to 1:9, more preferably 1:1 to 3:7.

The used rice husk ash additionally comprises preferably the following chemical composition according to DIN EN ISO 12677 (February 2013), wherein the individual constituents (free of ignition loss) add up to 100 wt %:

| | Amount [wt %] | |
| --- | --- | --- |
| | | preferably |
| $SiO_2$ | 92 to 98 | 94 to 97 |
| $P_2O_5$ | 0.5 to 2.0 | 0.5 to 1.5 |
| $K_2O$ | 1.0 to 3.0 | 1.5 to 2.5 |
| Residual oxides | 0.5 to 3.0 | 1.0 to 2.0 |

The used biogenic silicic acid, in particular the rice husk ash, also comprises preferably the following grain distribution according to DIN 66165-2 (April 1987) relative to dry mass, wherein the individual constituents add up to 100 wt %:

| Grain size | Amount [wt %] | |
| --- | --- | --- |
| | | preferably |
| ≥2.0 | 0 to 3.0 | 0.01 to 0.5 |
| <2.0-1.0 | 0.05 to 4.0 | 0.1 to 2.0 |
| <1.0-0.5 | 1.0 to 40.0 | 1.5 to 35.0 |
| <0.5-0.3 | 3.95 to 40.0 | 8.39 to 30.0 |
| <0.3 | 30.0 to 95.0 | 40.0 to 90.0 |

The bulk weight according to DIN EN 1097-3 (June 1998) of the used biogenic silicic acid, in particular of the rice husk ash, advantageously amounts to 0.05 to 0.5 g/cm$^3$, preferably 0.1 to 0.4 g/cm$^3$.

The finished mixture is then placed into a mold and is compacted therein. The compacting takes place in particular by means of superimposed load vibration or uniaxial pressing.

For the superimposed load vibration the mold is placed on a vibration table. A weight is placed onto the finished mixture located in the mold, then the vibration table is activated and the mixture is compacted by means of the vibration. With the superimposed load vibration method, generally smaller format sizes are produced.

With uniaxial pressing, the mold filled with the finished mixture is placed into a press, wherein a covering plate is placed atop the mixture. Then the upper stamp of the press is moved against the covering plate and the mixture is compacted under a specific pressure. Preferably several press strokes are run. By means of uniaxial pressing, generally larger plate format sizes are produced.

After the compacting, the green plate is removed from the mold and allowed to set. The setting process takes place in particular at 110 to 200° C. for preferably 4 to 12 hours. The drying takes place in particular at a temperature below the ignition temperature of the binding material and below the expansion temperature of the expanding agent. In addition, the temperature is selected such that the binding material sets and/or hardens.

The plate 1 then comprises advantageously a dry apparent density $p_0$ of 0.3 to 1.5 g/cm$^3$, preferably from 0.5 to 1.3 g/cm$^3$ according to DIN EN 1094-4 (September 1995).

In addition, the plate 1 comprises advantageously a porosity from 60 to 90%, preferably from 70 to 80% according to DIN EN 1094-4 (September 1995).

The cold compression strength of the plate 1 according to the present disclosure lies advantageously at 3.0 to 25.0 MPa, preferably at 5.0 to 20.0 MPa according to DIN EN 993-5 (December 1998).

And the cold bending strength of the plate 1 according to the present disclosure advantageously amounts to 1.5 to 10.0 MPa, preferably 2.0 to 8.0 MPa according to DIN EN 993-6 (April 1995).

In addition, the plate 1 comprises preferably the following thermal conductivities according to DIN EN 993-15 (July 2005).

| | Thermal Conductivity [W/mK] | |
| --- | --- | --- |
| | | preferably |
| at 26° C. | 0.10 to 0.14 | 0.11 to 0.13 |
| at 307° C. | 0.12 to 0.16 | 0.13 to 0.15 |

The plate 1 according to the present disclosure can be used in a particularly advantageous manner as a covering plate 5a;b for covering of an exposed surface 6a of a metal bath 6 in an open top metallurgical vessel.

The metallurgical vessel to be covered pertains in particular to a ingot mold 7 (FIGS. 2-4) for the, in particular rising, block casting or a casting distributor 8 (FIGS. 5 and 6), preferably a continuous casting distributor (tundish) or a casting ladle.

For the rising block casting of metal, in particular steel, a steel mill usually comprises a lower frame 10 with a casting channel 11 for feeding the molten metal, in particular the steel. In addition, the apparatus 9 comprises the ingot mold 7 to accommodate the metal bath 6. The ingot mold 7 comprises a lower and an upper, open ingot mold end 7a, b. The upper ingot mold end 7b forms a ingot mold head of the ingot mold 7.

Figure 2:
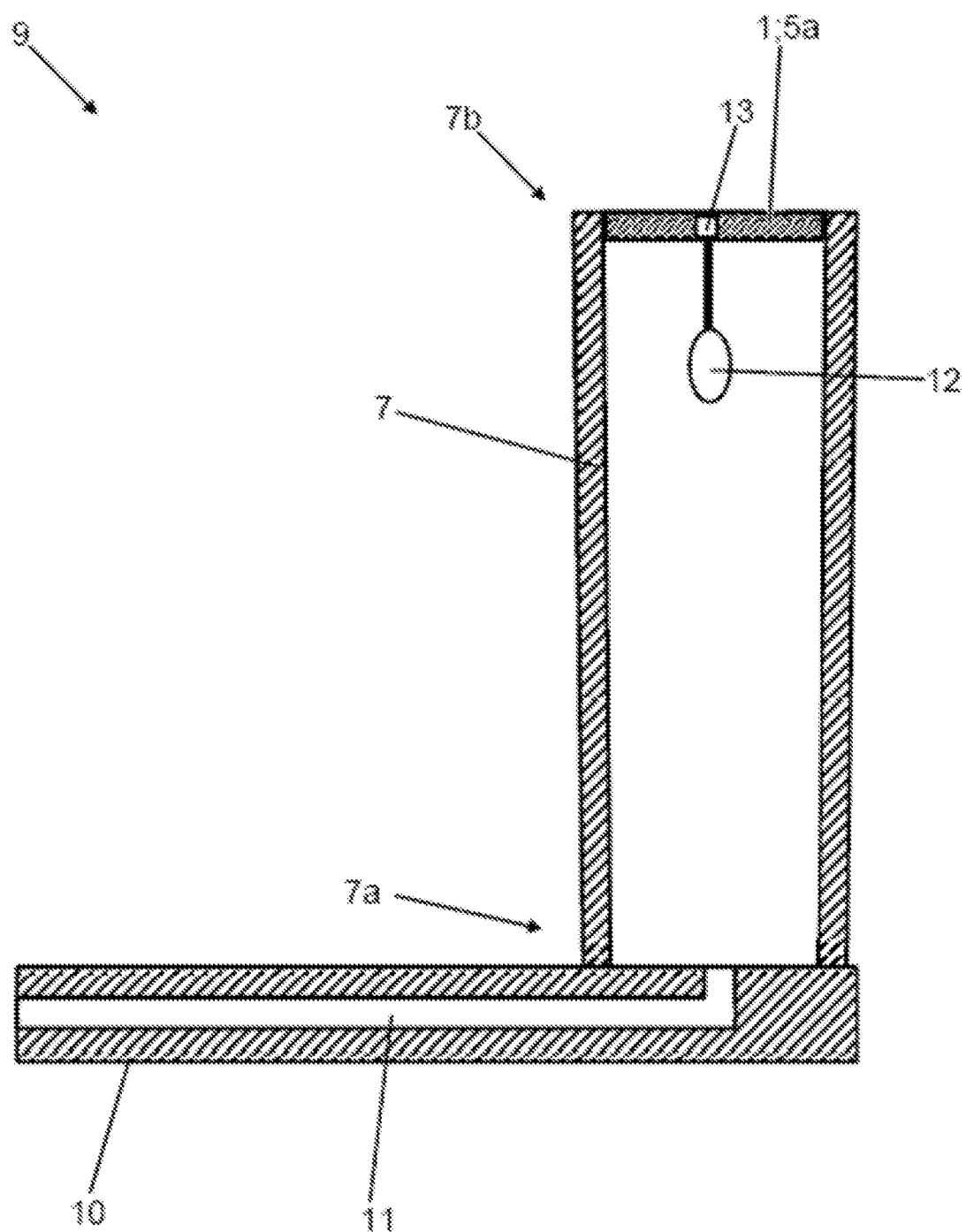
FIG. 2—A schematic and greatly simplified ingot mold for the rising ingot casting before beginning of the casting process.

The covering plate 5a according to the present disclosure is secured to the upper, open ingot mold end 7b of the ingot mold 7 before beginning of the block casting (FIG. 2). Thus, the metal bath 8 initially is indirectly thermally isolated by the covering plate 5a, thus without direct contact. A casting powder bag 12 filled with casting powder is secured onto the covering plate 5a such that the bag 12 hangs down from the covering plate 5a into the ingot mold 7. To secure the casting powder bag 12 the covering plate 5a comprises preferably a central recess 13 passing from the one plate surface to the other.

Figure 3:
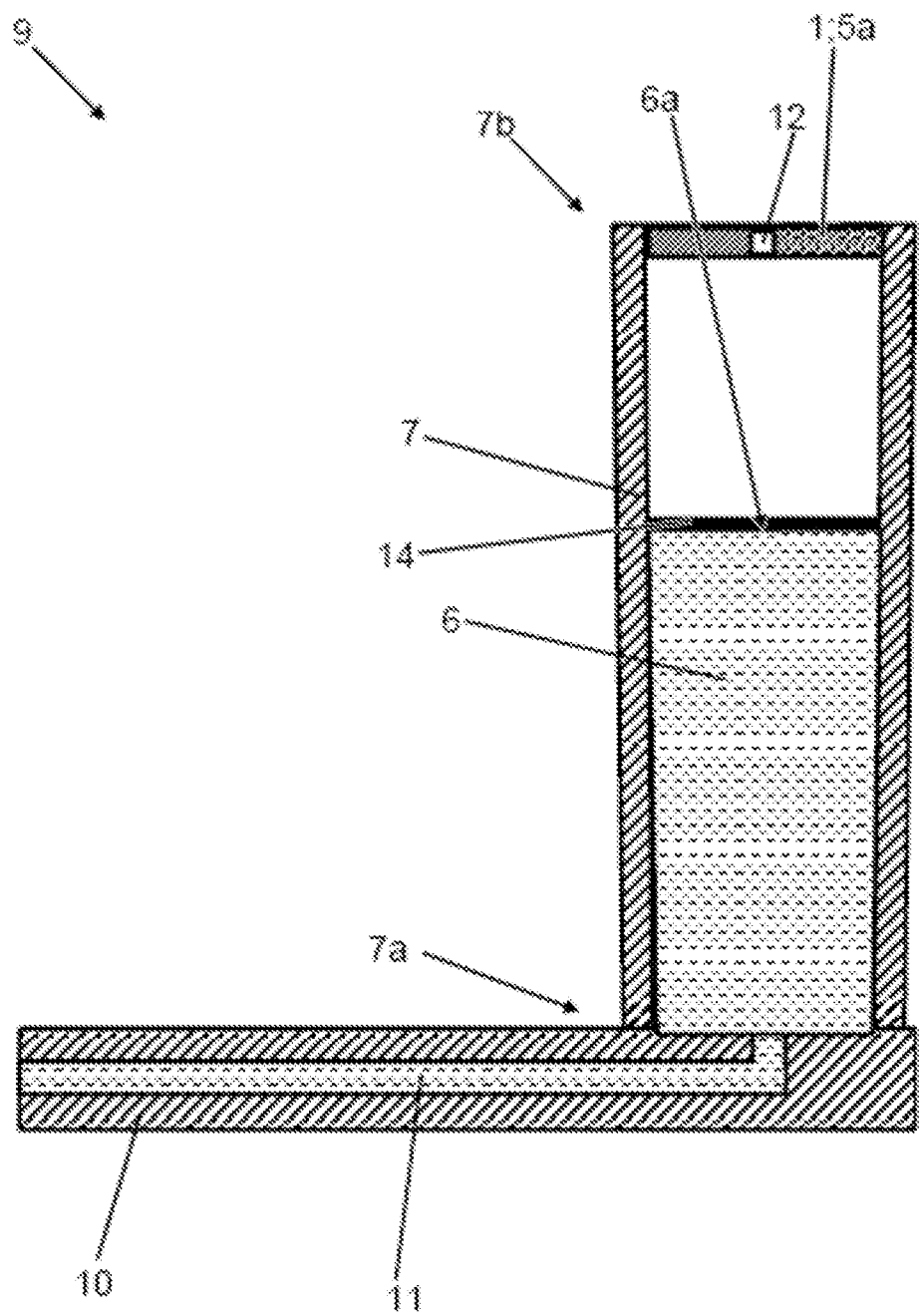
FIG. 3—The ingot mold according to FIG. 2 during the casting process.

Now the molten metal, in particular the molten steel, is filled through the casting channel 11 from below into the ingot mold 7 and rises upward in the mold 7 (FIG. 3). The metal bath 6, in particular the steel bath, usually has a temperature of about 1550° C. The casting powder bag 12 after a short time and owing to the great heat of the molten steel, burns up so that the casting powder is distributed upon a surface 6a of the metal bath 6 and forms a superficial casting powder layer 14. In addition, the casting powder is distributed between the ingot mold 7 and the metal bath 6 and acts as a separating agent.

Figure 4:
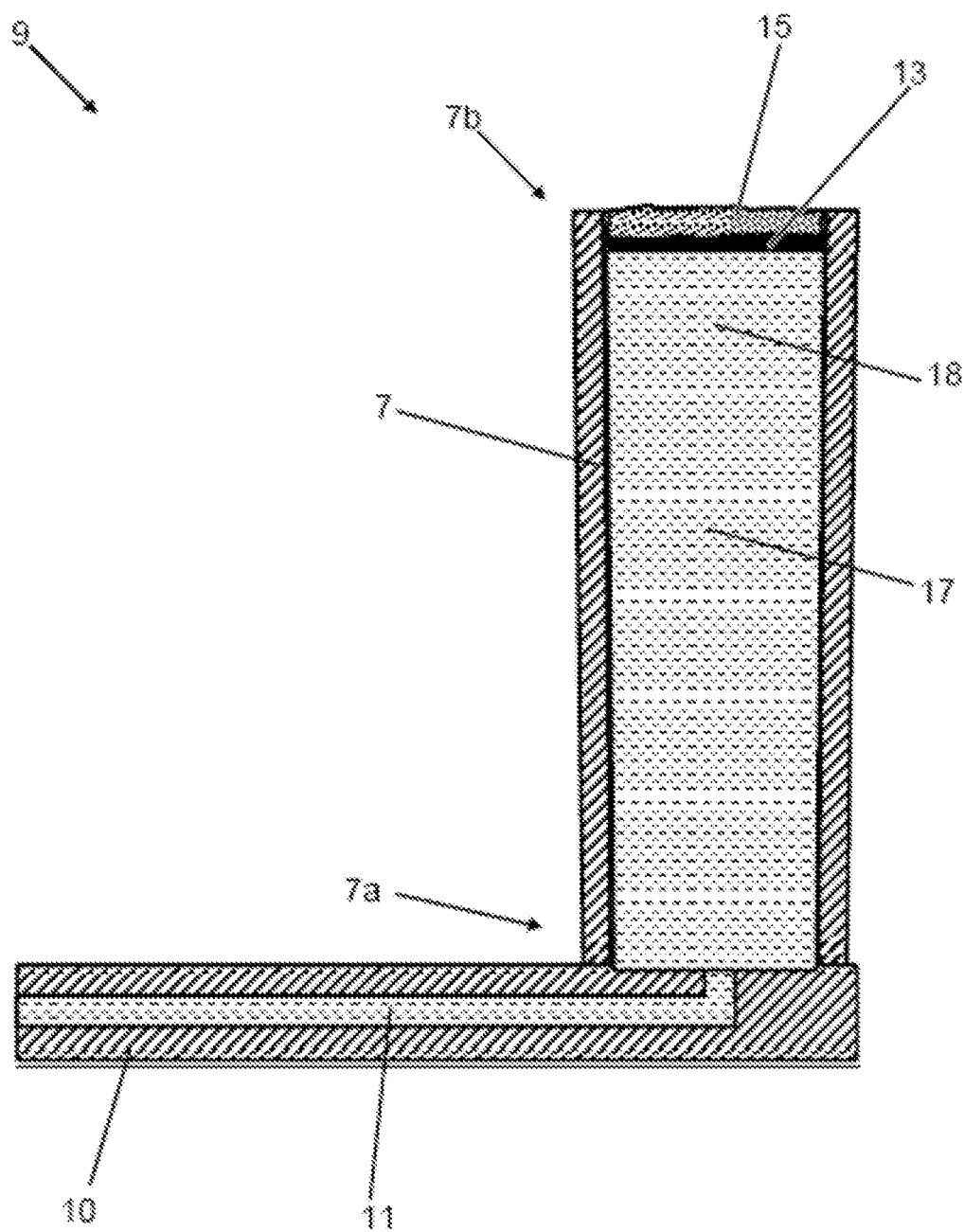
FIG. 4—The ingot mold according to FIG. 2 at the end of the casting process.

During the casting, the metal bath 6 rises up to the covering plates 5a and forms a solidifying ingot 17 with an upper ingot head 18. The covering plate 5a disintegrates, at the latest upon direct contact with the metal bath 6, due to the high temperature of the metal bath 6, and forms a continuous covering layer 16 of free-flowing, refractory material which covers and isolates the surface 6a of the metal bath and/or the ingot head 18 (FIG. 4). It consists of a loose, bulk material made of the refractory aggregate materials and is located upon the casting powder layer 14.

The disintegration of the covering plate 5a is triggered firstly by the combustion of the temporary binding material, and secondly by the expansion of the expanding agent. Advantageously the loose, bulk material of the covering layer 15 consists of the biogenic silicic acid, preferably of the rice husk ash. Now the covering layer 15 in a known manner ensures the shielding of the metal bath surface 6a from the atmosphere and ensures an excellent thermal insulation. The covering layer 16 isolates the ingot head 18 from the atmosphere and thus ensures a slow cooling of the ingot head 18. At the end of the casting process, the loose, bulk material is removed in the known manner, e.g. by suctioning off.

Figure 5:
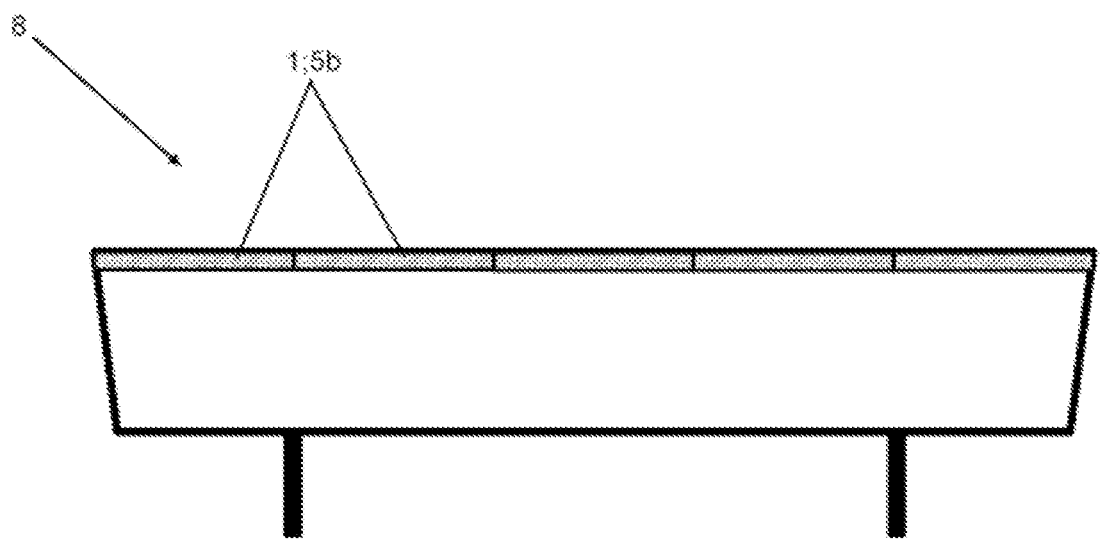
FIG. 5—A schematic and greatly simplified depiction of a tundish before the casting.
Figure 6:
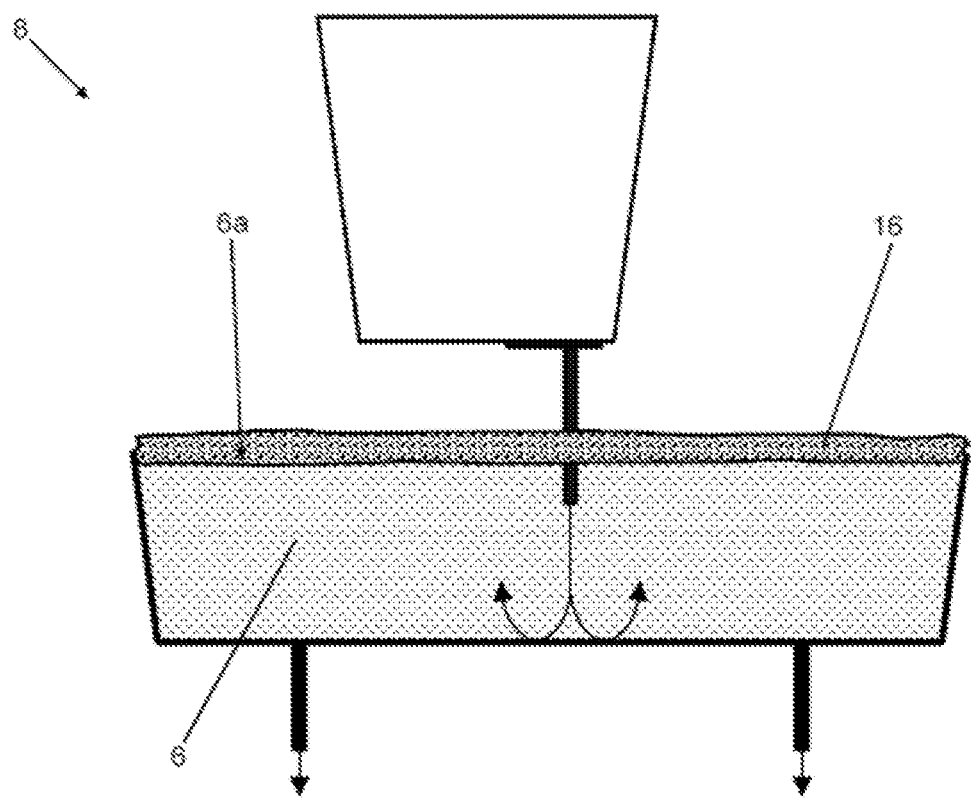
FIG. 6—The casting distributor according to FIG. 5 after the casting.

As already explained, the covering plate 5b according to the present disclosure can also be used for covering of the metal bath surface 6a in a casting distributor 8 (FIGS. 5 and 6). Before the casting, the casting distributor 8 is advantageously covered with several covering plates 5b (FIG. 5).

During the casting, the metal bath 6 rises up to the covering plates 5*b*. The covering plates 5*b* disintegrate, at the latest upon direct contact with the metal bath 6, due to the high temperature of the metal bath 6, and form a continuous covering layer 16 of free-flowing, refractory material which covers the metal bath surface 6*a* (FIG. 6).

The advantage of the covering plate 5*a;b* according to the present disclosure is that the dust generation is reduced significantly. Placement of the covering plates 5*a;b* onto the ingot mold 7 and/or the casting distributor 8 is additionally much simpler than the placement of a loose, bulk material onto the metal bath surface. In addition, this can occur before filling of the molten metal, which means a much reduced temperature exposure for the particular worker. Within the scope of the present disclosure it is of course quite obvious that the covering plate 5*a;b* can be placed directly upon the molten metal.

In addition, when using the covering plate 5*a* as a retaining plate for the casting powder bag 12, an additional process step is eliminated. This is because the removal of the retaining plate and subsequent application of the loose rice husk ash is omitted.

Moreover, the inventive plate 1 comprises excellent thermal insulating properties, both in the plate form at low temperatures, and also at high temperatures in the free-flowing form. Especially as an ingot head covering in the rising block casting, this ensures a constant, good quality of the ingot head. The good thermal insulation is a result, in particular, of the very good heat insulating properties of biogenic silicic acid and its very high melting point of about 1650 C.

Furthermore, the invented plate 1 is free of harmful pollutants. In addition, the rice husk ash pertains to a natural, recycling product.

For this reason, the plate 1 according to the present disclosure can also be used advantageously for other applications:

For example, the inventive plate 1 can be used as a fire-protection plate, e.g. for filling of cavities. In case of fire, the plate 1 disintegrates and fully seals the cavity in order to prevent the exit of hot and toxic gases.

It also remains within the scope of the present disclosure to use as aggregate material, a granulate of biogenic silicic acid, in particular of rice husk ash, instead of or in addition to the pure biogenic silicic acid. The granulate grains and/or the aggregate grains in this case consist of agglomerated grains of biogenic silicic acid which are bonded by a set binding agent. But the aggregate grains 3 made of a pure, biogenic silicic acid, in particular of rice husk ash, are preferred.

Also, the production can be advantageously implemented in that the biogenic silicic acid, in particular the rice husk ash, can be granulated with water and/or with at least one binding agent before mixing with the other constituents of the plate, and the soft and/or ductile, not yet set granulate can be mixed in with the remaining constituents. Preferably the binding agent pertains to the same binding agent and/or the same binding agents which is/are used for the plate. During compaction or pressing, the ductile granulate grains are destroyed, so that the plate with the aggregate grains of the biogenic silicic acid is formed. The advantage of this variant of the method is that the generation of dust is less.

EXAMPLE

A plate according to the present disclosure was produced from a batch having the following composition, by means of uniaxial pressing:

|  | Amount[wt-%] |
|---|---|
| Binding material (dextrin-citric acid combination) | 40 |
| rice husk ash (NERMAT BF - E) | 59 |
| Expanded graphite (ES 350 F5) | 1.0 |

The finished mixture was compacted with a surface weight of 0.5 N/mm². The plate was removed from the mold and dried on a tray at 110° C. for 12 h in a drying oven. The plate had the following dimensions: 500×500×50 mm³. The disintegration of the produced plate was tested as described above at 800° C. furnace temperature.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

While the above description constitutes the preferred embodiments of the present invention, it will be appreciated that the invention is susceptible to modification, variation and change without departing from the proper scope and fair meaning of the accompanying claims.

The invention claimed is:

1. A heat insulating plate for isolating or thermally insulating a metal bath comprising molten metal in a metallurgical vessel, wherein the plate is configured to transform into a covering layer capable of isolating or thermally insulating the metal bath or a metal solidified therefrom, the plate comprising a binding agent matrix of at least one set binding material in which aggregate grains of biogenic silicic acid are incorporated, wherein as additional aggregate material, the plate comprises at least one expanding agent in unexpanded form, the expanding agent configured to expand under temperature load, such that the plate disintegrates into the covering layer comprising a loose, free-flowing bulk material, at the latest upon direct contact with the metal bath;

wherein the isolation or thermal insulation of the metal bath and the metal solidified therefrom is provided by the heat insulating plate or the covering layer.

2. The heat insulating plate according to claim 1, wherein the plate disintegrates from a temperature of ≥150° C. and ≤800° C.

3. The heat insulating plate according to claim 1, wherein the expanding agent pertains to an agent made of intumescent material.

4. The heat insulating plate according to claim 1, wherein the biogenic silicic acid pertains to rice husk ash and/or to diatomaceous earth (kieselguhr) and/or to siliceous rock and/or diagenetic radiolarian taxa solidified into stone and/or sponges made of opal.

5. The heat insulating plate according to claim 1, wherein as aggregate material, the plate exclusively comprises biogenic silicic acid and the at least one expanding agent.

6. The heat insulating plate according to claim 1, wherein the plate comprises a dry apparent density $p_0$ from 0.3 to 1.5 g/cm³ according to DIN EN 1094-4:1995-09.

7. The heat insulating plate according to claim 1, wherein the plate comprises a porosity from 60 to 90% according to DIN EN 1094-4:1995-09.

8. The heat insulating plate according to claim 1, wherein the plate comprises a cold compression strength from 3.0 to 25.0 MPa according to DIN EN 993-5:1998-12.

9. The heat insulating plate according to claim 1, wherein the plate comprises a cold bending strength from 1.5 to 10.0 MPa according to DIN EN 993-6: 1995-04.

10. The heat insulating plate according to claim 1, wherein the plate comprises the following thermal conductivities (WLF) according to DIN EN 993-15:2005-07:

|  | Thermal conductivity [W/mK] |
| --- | --- |
| at 26° C. | 0.10 to 0.14 |
| at 307° C. | 0.12 to 0.16 |

11. The heat insulating plate according to claim 1, wherein the aggregate grains comprising the biogenic silicic acid are made of agglomerated grains of biogenic silicic acid which are bonded by at least one set binding material.

12. The heat insulating plate according to claim 1, wherein the binding agent matrix consists of at least one set, temporary organic binding material or comprises at least one set, temporary organic binding material.

13. The heat insulating plate according to claim 12, wherein the plate is configured such that the temporary binding material burns out under temperature load, thereby assisting the disintegration of the plate into the loose, free-flowing bulk material.

14. The heat insulating plate according to claim 12, wherein the expanding agent expands at an expansion temperature that lies in the range of the ignition temperature of the temporary binding material;
wherein the ignition temperature represents the temperature at which the temporary binding material self-ignites in the presence of air due exclusively to temperature without the occurrence of a spark or other ignition source.

15. The heat insulating plate according to claim 12, wherein the temporary binding material pertains to a polymer, which sets due to polycondensation and burns up without residue.

16. The heat insulating plate according to claim 12, wherein the plate comprises as the temporary binding material cellulose and/or polyvinyl alcohol and/or polyvinyl acetate and/or polyvinyl pyrrolidone and/or lignin sulfonate.

17. The heat insulating plate according to claim 1, wherein the binding agent matrix comprises at least one permanent, set binding material or consists of at least one permanent set binding material.

18. The heat insulating plate according to claim 1, wherein the plate disintegrates from a temperature of ≥200° C. and ≤400° C.

19. The heat insulating plate according to claim 3, wherein the expanding agent pertains to expandable graphite or unexpanded perlite or unexpanded vermiculite or unexpanded clay or synthetic resins or melamine-phosphoric acid compounds.

20. The heat insulating plate according to claim 19, wherein the synthetic resins including urea formaldehyde and/or melamine formaldehyde resins.

21. The heat insulating plate according to claim 15, wherein the temporary binding material pertains to a polysaccharide.

22. The heat insulating plate according to claim 15, wherein the polymer burns up without residue in an oxygen atmosphere.

23. The heat insulating plate according to claim 5, wherein as aggregate material, the plate exclusively comprises rice husk ash and the at least one expanding agent.

24. The heat insulating plate according to claim 6, wherein the plate comprises a dry apparent density $p_0$ from 0.5 to 1.3 g/cm$^3$ according to DIN EN 1094-4:1995-09.

25. The heat insulating plate according to claim 1, wherein the plate comprises a porosity from 70 to 80% according to DIN EN 1094-4:1995-09.

26. The heat insulating plate according to claim 1, wherein the plate comprises a cold compression strength from 5.0 to 20.0 MPa according to DIN EN 993-5:1998-12.

27. The heat insulating plate according to claim 1, wherein the plate comprises a cold bending strength from 2.0 to 8.0 MPa according to DIN EN 993-6: 1995-04.

28. A method for producing a heat insulating plate according to claim 1, characterized by the following method steps:
a) Preparing a mixture comprising the aggregate grains of the biogenic silicic acid, at least one binding material, and at least one expanding agent,
b) Filling the mixture into a mold,
c) Compacting the mixture to form a green plate,
d) Removing the green plate from the mold, and
e) Letting the green plate set to form the heat insulating plate.

29. The method according to claim 28, wherein the composition of the mixture is adjusted such that the mixture after 30 seconds under vibration has a slump of 200 to 500 mm determined in reference to DIN EN ISO 1927-4:2013-03.

30. The method according to claim 28, wherein the mixture has the following composition relative to total dry mass, wherein the individual constituents add up to 100 wt %:

|  | Amount [wt %] |
| --- | --- |
| Temporary binding material | 5.0 to 30.0 |
| Biogenic silicic acid | 35.0 to 94.5 |
| Expanding agent | 0.5 to 5.0 |
| Other aggregates | 0 to 20.0 |
| Other constituents | 0 to 10.0 |

31. The method according to claim 28, wherein before mixing with other constituents of the mixture, the aggregate grains from the biogenic silicic acid are agglomerated with water and/or with at least one binding agent to form granulate grains and the granulate grains in the ductile state are mixed with the other constituents of the mixture.

32. A process for using the plate according to claim 1 to provide isolation or thermal isolation of a metal bath comprising molten metal in a metallurgical vessel, the process comprising:
covering an exposed surface of the metal bath with the plate; and
subjecting the plate to a temperature load, such that the plate disintegrates into a covering layer comprising a loose, free-flowing bulk material capable of further isolating or thermally insulating the metal bath or a metal solidified therefrom, at the latest upon direct contact with the metal bath;
wherein the isolation or thermal insulation of the metal bath and the metal solidified therefrom is provided by the plate or the covering layer.

33. The process for using the plate according to claim 32, wherein after the thermal disintegration of the plate, the loose bulk material provides for thermal isolation of the molten metal.

34. The process for using the plate according to claim 32, wherein after the thermal disintegration of the plate, the loose bulk material provides for isolation of an ingot head of an ingot solidifying from the molten metal during rising ingot casting.

35. The process for using the plate according to claim 32, wherein the plate covers the metal bath located in an ingot mold.

36. The process for using the plate according to claim 32, wherein the plate covers the metal bath located in a casting distributor.

37. The process for using the plate according to claim 35, wherein the plate covers the metal bath in the ingot mold during rising or falling ingot casting.

38. The process for using the plate according to claim 32, wherein the plate provides for thermal isolation of molten steel.

39. The process for using the plate according to claim 32, wherein the plate provides for thermal isolation of the molten metal in the production of steel.

40. The process for using the plate according to claim 36, wherein the plate covers the metal bath in the casting distributor during rising or falling ingot casting.

* * * * *